United States Patent [19]

Pentz et al.

[11] 4,053,421

[45] Oct. 11, 1977

[54] SEDIMENTATION TANK WITH RAKING STRUCTURE

[75] Inventors: Howard Pentz; R. Henry Weed, both of Lansdale; John C. Lodholz, Perkasie, all of Pa.

[73] Assignee: FMC Corporation, Chicago, Ill.

[21] Appl. No.: 699,056

[22] Filed: June 23, 1976

[51] Int. Cl.² .................. B01D 12/00; B01D 17/00; B01D 43/00
[52] U.S. Cl. .................................. 210/528; 210/531
[58] Field of Search ................... 210/85, 86, 96, 97, 210/112, 523, 525, 527–531, 519, 520, 143, 145, 111, 113, 241, 407, 298

[56] References Cited

U.S. PATENT DOCUMENTS

| | | | |
|---|---|---|---|
| 2,305,929 | 12/1942 | Lund et al. | 210/525 |
| 2,557,316 | 6/1951 | Scott | 210/531 |
| 2,768,749 | 10/1956 | Easterday | 210/528 |
| 3,295,835 | 1/1967 | Klopper | 210/528 |
| 3,933,655 | 1/1976 | Grzina et al. | 210/528 |

Primary Examiner—Frank W. Lutter
Assistant Examiner—Frank Sever
Attorney, Agent, or Firm—Dressler, Goldsmith, Clement, Gordon & Shore, Ltd.

[57] ABSTRACT

A raking structure for moving settled solids to a discharge opening in the bottom of a sedimentation tank is disclosed herein. The raking structure consists of a rotatable member and a rake arm pivoted on the rotatable member along an inclined pivot axis with a counterweight connected to the rake arm through cable means so that the torque load required to cause the arm to pivot can be varied. The rake arm may also have means for varying the buoyancy of the rake arm and thereby vary the torque or moment compound required to pivot the rake arm with respect to the rotatable member.

8 Claims, 3 Drawing Figures

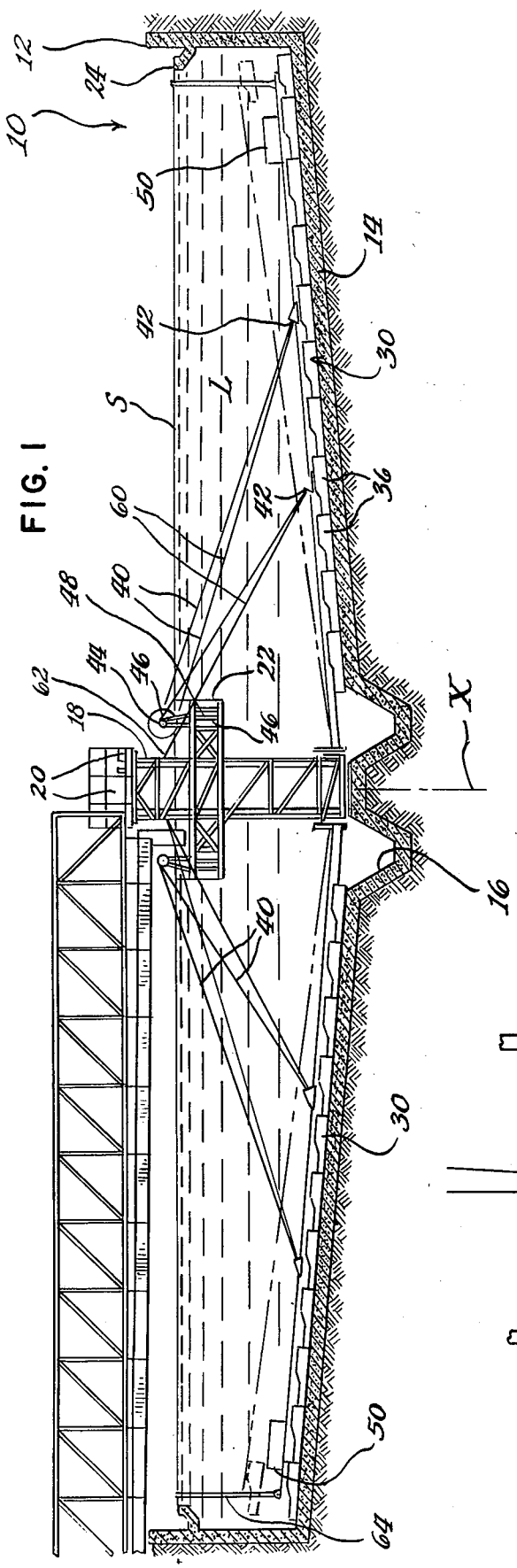
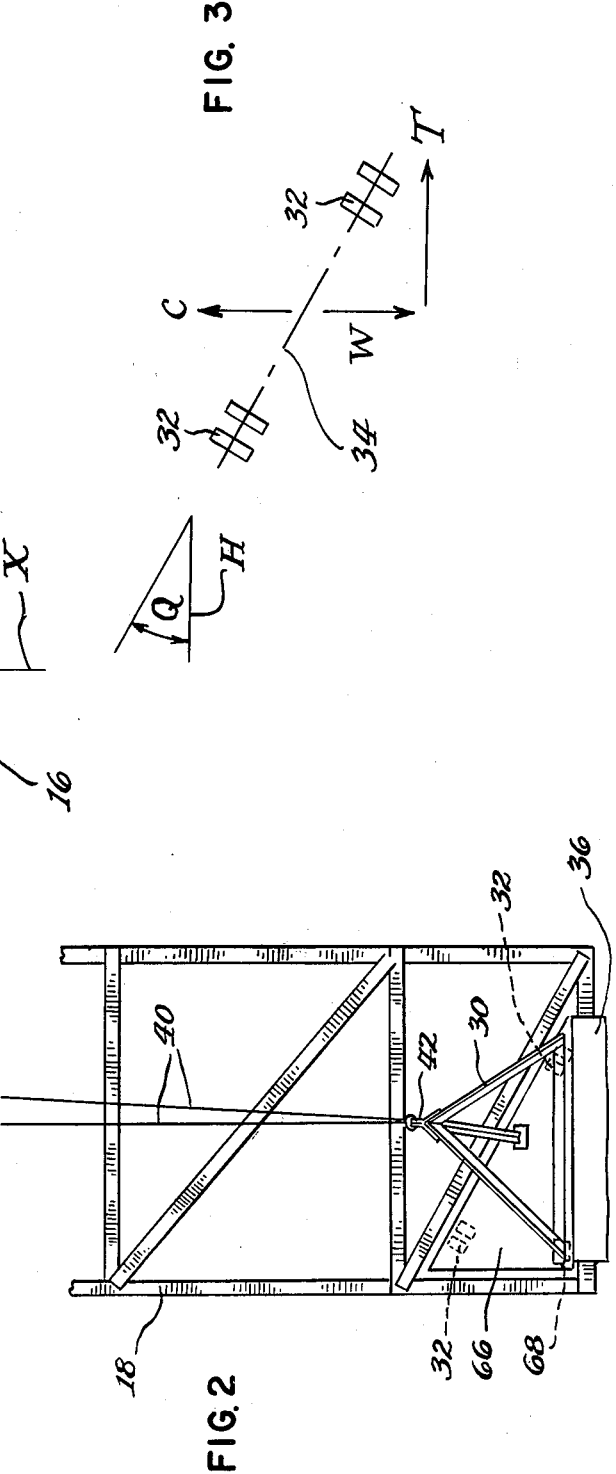

SEDIMENTATION TANK WITH RAKING STRUCTURE

BACKGROUND OF THE INVENTION

The present invention relates generally to continuously operating sedimentation tanks wherein the settled solids or sludge are continuously removed from the tank bottom with a rotary rake structure that conveys the sludge or settled solids to a sump or center discharge opening. The operation of such units is ordinarily continuous.

In large tanks, which may exceed 100 feet in diameter, the raking structure that is required to move the sludge to a center discharge opening is generally very massive to overcome the resistance of the sludge. In some instances, the sludge may become excessively heavy which may result in overloading the power source which drives the rake structure. In other instances, foreign substances such as rocks may be accidentally introduced into the tank and result in an obstruction to the raking movement of the rake arm.

To overcome this problem, it has been proposed to pivotally support the rake structure on the rotatable driven member so that the rake structure can be pivoted upwardly when the rake arm encounters heavy resistance to movement. Such an arrangement is generally disclosed in Scott U.S. Pat. No. 2,122,384. The apparatus disclosed in the Scott patent is constructed so that the rake arms can pivot upwardly when an obstruction is encountered.

More recently various alternate proposals have been developed for accomodating movement of the rake arm when an excessive load is encountered by the motor or when an obstruction is located in the tank. Examples of such devices are disclosed in U.S. Pat. Nos. RE27,000; 3,542,207; and 3,833,126. In all of these patents, the rake structure is pivoted in some respect on a member that is rotated about the center of the tank and cables extend from the rake structure and are attached to fixed booms that extend from the rotating member adjacent the upper end thereof. All of these mechanisms provide for an automatic lifting of the scraper arms at some specified torque level to prevent an excessively high torque load from being developed in the drive motor and also allow the use of smaller motors.

In these devices, the boom or dray arm leads the rake arm so that the cables are at an angle with respect to the bottom of the tank. Thus, an upward force is developed in the cables as a function of the horizontal tension force due to the drag resistance of the sludge on the rake arms. When the vertical force exceeds the dead weight load of the rake arm, the rake arm will swing upwardly about the pivot at the inner end thereof.

In devices of this type, one of the shortcomings is the fact that the torque must continually increase in order for the rake arm to continue to raise to a new balanced position. Another problem encountered with devices of the above type is the fact that the torque force at which the rake arm will pivot upwardly is not readily adjustable for different conditions. It will be appreciated that the primary factor in determining at what torque force the rake arm will pivot is the dead weight or total weight of the rake arm which, of necessity, is dependent upon the structural requirements of the unit.

SUMMARY OF THE INVENTION

According to the present invention, an improved raking mechanism has been developed which is self-relieving in that the rake arms will continue to lift if the torque load decreases slightly. Furthermore, the amount of torque required to initiate the pivotal movement can readily be varied in the field.

More specifically, the present invention relates to a raking structure for moving settled solids to a discharge opening in the bottom of a sedimentation tank and includes a rotatable member located in the tank and driven about a vertical axis with a rake arm supported at one end on the rotatable member about a pivot axis that is angularly related to the vertical axis and to a horizontal plane. A cable, having one end connected to the rake arm at a location spaced from the pivot axis, and is entrianed over a drum with a counterweight connected to the inner end of the cable. Thus, the torque force required to initiate the pivotal movement of the rake arm can be varied by utilizing a counterweight with a different mass. The torque load required to initiate pivotal movement of the rake arm can also be varied by utilizing a buoyant member connected to the outer end of the rake arm, such as a flexible bag which can be inflated.

The raking structure also preferably includes further cables which define a lowermost position for the rake arm.

BRIEF DESCRIPTION OF THE SEVERAL VIEWS OF THE DRAWINGS

FIG. 1 shows a sectional view of a sedimentation tank having the present invention incorporated therein;

FIG. 2 is a fragmentary view as viewed along line 2—2 of FIG. 1 showing the connection between the support and the rake arm; and FIG. 3 is a graph showing the direction of forces on the rake arm.

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

FIG. 1 of the drawings discloses a sedimentation or settling tank generally disignated by the reference numeral 10. Tank 10 includes a generally circular sidewall 12 and a bottom wall 14 with the bottom wall 14 sloping slightly from the outer periphery towards a center discharge opening or sump 16. A torque cage or rotatable member 18 is supported on the bottom wall 14 at the center of the tank and is rotatable through suitable drive means 20, such as an electric drive motor and a gear reduction unit. Rotatable member or torque cage 18 also supports an influent baffle 22 which surrounds rotatable member 18 and is secured thereto. The area between the lower and upper ends of the baffle 22 and cage 18 are open so that liquid to be clarified can be delivered through cage 18 and flow downwardly into the center of the tank. The periphery of tank 12 also has an overflow weir 24 wherein clarified liquid flows and is removed therefrom through a pipe (not shown).

During the flow of the liquid from the area inside baffle 22 to the overflow weir 24, solids or sludge are separated from the liquid and settle to the bottom of the tank wherein the solids are removed through a raking structure that will now be described. The raking structure consists of a pair of rake arms 30 which have their inner ends supported for pivotal movement with respect to rotatable member 18 through a pair of brackets 32. As illustrated in FIGS. 2 and 3, the two brackets are spaced from each other and define a pivot axis 34 for rake arm 30 which is angularly related to the vertical axis X of rotation for member 18 as well as a horizontal plane which extends perpendicular to the vertical axis. As indicated in FIG. 3, axis 34 defines an angle Q with respect to horizontal plane H and this angle will be described in more detail later.

According to the present invention, the rake arms 30, which have a plurality of blades 36 secured thereto, are designed to automatically lift when a predetermined force or resistance to movement is encountered to prevent overloading of the drive means 20. Furthermore, this required predetermined force or torque load for initiating pivotal movement of the rake arms about pivot axis 34 can readily be varied to suit the needs of a particular operation at a given time.

As most clearly shown in FIG. 1, the raking structure includes a pair of cables 40 for each arm 30 and one end of each cable 40, which define cable means, is connected to a rake arm 30 through a connection 42 which is located a substantial distance from the pivot axis 34. Cables 40 are entrained over a support in the form of a drum 44 which is rotatable on a pin 46 that is supported on torque cage or rotating member 18.

The opposite ends of the cables 40 have a counterweight 46 secured thereto which may be guided in a tube 48 defined on cage 18.

An inspection of FIG. 2 shows that cables 40 extend substantially vertically upwardly from rake arm 30 to the drum 44 so that the counterweight produces a vertical component of moment C due to the counterweight on the opposite ends of cables 40. The downwardly directed arrow indicated in FIG. 3 by the reference numeral W is the moment about pivot axis 34 which results from the weight of rake structure 30 while the arrow designated as T in FIG. 3 is the moment due to the sludge or solid loading on the rake arm 30. Because the pivot axis 34 is angularly related with respect to the horizontal plane H as well as the vertical axis X, the bending moment about the pivot axis due to the sludge loading resolves into a lifting moment tending to pivot rake arm 30 about axis 34. Of course, the moment resulting from counterweight 36 also provides a lifting moment and serves to partly support the arm. Therefore, the predetermined force or torque at which the arm begins to pivot about axis 34 can readily be varied by utilizing a counterweight of a greater or lesser mass. This arrangement gives the operator the ability to increase or decrease the sludge load required to raise the rake arm after the mechanism has been installed in the field.

With the arrangement so far described, the angle $Q$ can readily be calculated after the design sludge loading or predetermined force required to initiate movement of the rake arm 30 and the arm dead weight have been determined. This calculation can be made from the following equation:

$$\mathrm{Tan} Q = (W-C)/T$$

Where
$W$ is the component of the moment due to the vertical force of arm dead weight,
$C$ is the component of moment on the pivot due to the counterweight 46 acting through cables 40 on arm 30 and,
$T$ is the component of moment due to the sludge load on rake arm 30. Furthermore, it has been determined that this angle $Q$ is not in any way related to the remainder of the tank configuration.

Of course, it will be appreciated, that after the entire tank has been assembled in the field, the predetermined force or torque that is required on the rake arm to initiate pivotal movement of the arm about pivot axis 34 can readily be varied by increasing or decreasing the weight of the counterweight 46. Thus, the predetermined force or moment required to initiate the pivotal movement can be determined by the operator after the unit has been installed in the field.

In addition to and/or in place of the counterweight 46, the means connected to the rake arm for changing the predetermined force or torque load required to initiate pivotal movement of the rake arm can also be varied by other means. For example, a flexible bag or other member may be secured to the outer end of the rake arm 30 and inflated to a desired level and the amount of inflation and/or pressurization of the fluid in the bag 60 will vary the buoyancy of the rake arm. These bags or flexible cylinders 50 can readily be inflated or deflated to vary the buoyancy of the rake arms 30 within the liquid in tank 10.

While not absolutely essential to the present invention, it is also desirable to define a lowermost position for the rake arms 30 which position is slightly spaced from the upper surface of bottom wall 14. This is accomplished by utilizing a further set of cables 60 of a fixed length that have one end connected to rake arms 30 through connections 42 and the opposite ends connected to rotatable member 18 at 62. Thus, these fixed length cables define additional cable means which define a lowermost position for the rake arms 30.

The lowermost position for rake arms 30 is further defined by having plate 66 on the inner end of rake arm 30 engage a stop plate 68 which is secured to cage or rotating member 18.

It is also desirable to have indicating means for indicating the position of the rake arm with respect to the bottom of the tank. This position indicating means is illustrated in the form of a rod 64 which is connected to the outer end of each arm 30 and extends to the surface S of the liquid L in tank 10. Thus, if the rake arms are for any reason pivoted upwardly, a portion of the rod 64 will extend above the surface of the liquid to give the operator an indication that the rake arm is operating in a partially elevated condition.

In addition to the advantage of being able to vary the torque moment required to initiate pivotal movement of rake arms 30, the arrangement described above has another advantage over the prior art type of units discussed above. One of the primary advantages is that the lifting force resulting from the counterweight 46 remains substantially constant throughout the pivotal movement of the rake arm which means that the arm will continue to swing upwardly even as the torque load is decreasing slightly. In the prior art, arrangements wherein a drag cable is used for supporting the rake arms, the slope of the drag cable decreases as each arm begins to raise. Therefore, the vertical lifting force or component on the arm also decreases. This means that as the arm begins pivoting or lifting, a larger torque force is required to maintain a force balance.

With the present arrangement, the rotating member or drive cage 18 and the drive means 20 will never experience excessive torque beyond the torque load designed into the system because the torque developed on drive means 20 and cage 18 is never greater than the torque required to initiate the pivotal movement of rake arm 30.

The present arrangement has the additional advantage of being substantially less expensive to construct than the prior art devices discussed above while having numerous additional features which are not found in the prior art.

What is claimed is:

1. A raking structure for moving settled solids to a discharge opening in the bottom of a sedimentation tank comprising a rotatable member located in said tank and driven about a vertical axis, a rake arm supported at one end on said rotatable member on a pivot axis that is angularly related to said vertical axis and a horizontal plane, cable means having one end connected to said rake arm at a location spaced from said pivot axis, said cable means being located substantially along a plane extending through said vertical axis, a support located above said pivot axis on said rotatable member with said cable means entrained over said support, and counterweight means connected to an opposite end of said cable means, said cable means and counterweight means functioning to vertically pivot said rake arm through an angle $Q$, in response to a predetermined resistance to the rotation of said rake arm, said angle $Q$ being defined by the equation:

$$\text{Tan } Q = W - C/T$$

where:
$W$ = the component of moment acting on said rake arm, due to the vertical force of the weight of said rake arm,
$C$ = the component of moment acting on said rake arm, due to said cable means and counterweight means, and,
$T$ = the component of moment acting on said rake arm due to said predetermined resistance.

2. A raking structure as defined in claim 1, in which said support includes a drum rotatable about a horizontal axis on said rotatable member.

3. A raking structure as defined in claim 1, further including means on said rake arm for varying the buoyancy of said rake arm.

4. A raking structure as defined in claim 1, further including second cable means having one end fixed to said rake arm and an opposite end fixed to said rotatable member, said second cable means defining a lowermost position for said rake arm.

5. A raking structure as defined in claim 1, further including indicating means for indicating the position of said rake arm with respect to said tank.

6. A raking structure for moving settled solids to a discharge opening in the bottom of a sedimentation tank comprising a rotating member located in said tank and driven about a vertical axis, a rake arm supported at one end on a pivot axis that is angularly related to said vertical axis and a horizontal axis so that said rake arm is pivoted about said axis when a predetermined torque load is developed on said arm and alterable means connected to said rake arm for determining said predetermined torque load, said means connected to said rake arm for varying said predetermined torque load functioning to vertically pivot said rake arm through an angle $Q$, in response to a predetermined resistance to the rotation of said rake arms, said angle $Q$ being defined by the equation:

$$\text{Tan } Q = (W - C)/T$$

where:
$W$ = the component of moment acting on said rake arm, due to the vertical force of the weight of said rake arm,
$C$ = the component of moment acting on said rake arm, due to said alterable means connected to said rake arm for determining said predetermined torque load, and
$T$ = the component of moment acting on said rake arm due to said predetermined resistance.

7. A raking structure as defined in claim 6, in which said last means includes an inflatable member secured to the outer end of said rake arm.

8. A raking structure as defined in claim 6, in which said last means includes cable means having one end connected to said rake arm and counterweight means connected to an opposite end of said cable means, said rotating member having a drum supported thereon with an intermediate portion of said cable means entrained over said drum.

* * * * *